US005398776A

United States Patent [19]

Forster

[11] Patent Number: 5,398,776

[45] Date of Patent: Mar. 21, 1995

[54] WHEEL HUB DRIVE

[75] Inventor: Franz Forster, Karstadt-Muhlbach, Germany

[73] Assignee: Linde Akiengesellschaft, Germany

[21] Appl. No.: 113,280

[22] Filed: Aug. 30, 1993

[30] Foreign Application Priority Data

Aug. 28, 1992 [DE] Germany ........................ 42 28 746.4

[51] Int. Cl.[6] ................................................ B60K 7/00

[52] U.S. Cl. .................................... 180/308; 180/247

[58] Field of Search ............... 280/308, 247, 242, 244, 280/65.5; 475/302, 140, 320, 321

[56] References Cited

U.S. PATENT DOCUMENTS

| | | | |
|---|---|---|---|
| 3,439,766 | 4/1969 | Dence et al. | 180/308 |
| 3,865,207 | 2/1975 | Schwab et al. | 180/308 |
| 4,213,514 | 7/1980 | Ehrlinger et al. | 180/308 |
| 4,275,616 | 6/1981 | Ehrlinger et al. | 180/308 |

FOREIGN PATENT DOCUMENTS

| | | | |
|---|---|---|---|
| 9304281 | 3/1993 | WIPO | 180/308 |

*Primary Examiner*—Margaret A. Forcarino
*Assistant Examiner*—Kevin Hurley
*Attorney, Agent, or Firm*—Webb Ziesenheim Bruening Logsdon Orkin & Hanson

[57] ABSTRACT

A drive for selectively driving a wheel hub which includes a motor with a hollow output shaft driving a planetary gear train with a sun wheel on the hollow output shaft. An output element is fixed to a portion of the wheel hub and a multi-plate clutch or brake selectively connects and disconnects the wheel hub and the hollow output shaft. An axially movable rod operates the clutch or brake and pressurized hydraulic fluid and a spring shift the rod axially to connect and disconnect the clutch or brake to control rotation of the wheel hub by the motor.

16 Claims, 2 Drawing Sheets

WHEEL HUB DRIVE

BACKGROUND OF THE INVENTION

1. Field of the Invention

The invention relates generally to a wheel hub drive and more particularly to a wheel hub drive having a drive motor and a single or a multi-stage planetary gear train which includes an input-end sun wheel directly or indirectly connected to the output shaft of the drive motor and an output element directly or indirectly connected to the wheel hub. A releasable connecting arrangement is located at the end of the drive motor output shaft remote from the drive motor for connecting and disconnecting components of the wheel hub drive. A hydraulically and spring-actuated axially movable piston operates the connecting arrangement.

2. Description of Related Prior Art

This type of wheel hub drive is disclosed in U.S. Pat. No. 4,213,514 entitled "Hydraulic Wheel Drive with Clutch" wherein a connecting multi-plate clutch is operated by a hydraulically operated annular piston which acts directly on the clutch disks and is located in the immediate area of the clutch disks. In the arrangement disclosed in the patent, the clutch requires a substantial amount of space because of the location of the piston. Additionally, it is necessary to pass the hydraulic fluid to operate the clutch through the entire length of the wheel hub drive which includes the drive motor, the planetary gear train and the clutch. An annular piston is supported by a bearing located in a reinforced center cover which can be removed to service the clutch. The output shaft of the drive motor extends through the clutch. This arrangement is expensive from both the production and the engineering standpoints.

SUMMARY OF THE INVENTION

The object of the present invention is to provide a wheel hub drive of the kind referred to above having a relatively simple and compact design and which can be economically produced.

These objects are achieved by locating the axially movable piston at the end of the wheel hub drive remote from the connecting arrangement and operatively connecting the piston with the connecting arrangement by means of an axial rod which extends through the center of the hollow output shaft of the drive motor. Accordingly, the invention provides a separation of the connecting arrangement and the piston which simplifies the design and reduces the required space. The connecting arrangement in the wheel hub drive according to the invention can be used as both a clutch and a brake. The clutch can be either frictionally or positively locked.

In one embodiment of the invention, the piston is actuated hydraulically against a spring force, so that the connecting arrangement is closed by the spring force when the piston is not hydraulically actuated. When the connecting arrangement is operating as a brake, it is a spring-loaded brake. The use of plate springs to generate the spring force provides a particularly space-saving design and very high pre-load forces can be obtained by using a plurality of plate springs. When the wheel hub drive is to be rotated, the spring-loaded brake is released by supplying hydraulic fluid to the face of the piston opposite the face which is in engagement with the springs by means of a suitable control circuit. The hydraulic drive motor is then actuated by a pressurized hydraulic fluid. Conversely, the spring-loaded brake can be engaged automatically if the pressure of the hydraulic fluid at the hydraulic motor drops below a certain level.

In another embodiment of the invention, the connecting arrangement is a plurality of annular plates or disks which are alternately directly or indirectly connected with the output shaft of the drive motor and with the wheel hub. The plates or disks are axially movable relative to the drive shaft and to an annular stop which is fixed to the wheel hub. The plates or disks are brought into and out of engagement with one another and with the stop by axial movement of an axial rod. Thus, when the connecting arrangement is closed, the input element of the planetary gear train is rotationally connected to its output element to produce a locking mechanism and immobilize the wheel hub drive.

It is advantageous if an axial bearing which can be brought into engagement with the connecting arrangement is located at the end of the axial rod remote from the drive motor. The inner stationary race of the axial bearing is non-rotatably connected to the end of the axial rod and the outer rotating race of the axial bearing can engage an annular plate of the connecting arrangement or an annular component which can engage an annular plate of the connecting arrangement. When the wheel hub is connected with the output shaft of the drive motor to brake the wheel hub, rotation of the axial rod and the piston are prevented.

In order to remove the load from the axial bearing when the connecting arrangement is released, a clearance is provided between the outer rotating race of the axial bearing and the radial face of the annular component of the connecting arrangement which can engage the outer rotating race of the axial bearing. The location of the axial bearing along the end of the axial rod is axially adjustable to change the axial length of the bearing clearance.

According to an embodiment of the invention, the axial rod is a rigid elongated unitary rod. However, a cable such as a Bowden cable can also be used for this purpose.

When an axial rod is used, the end of the rod associated with the connecting arrangement is threaded to receive an internally threaded bushing which carries the inner race of the axial bearing. This permits easy axial adjustment of the axial length of the bearing clearance by moving the bushing axially along the rod. The bushing is secured in the desired adjusted position on the axial rod by a lock nut.

The wheel hub is formed with an axial recess in the area of the connecting arrangement which is closed by a removable cover to permit the adjustment of the bushing to change the bearing clearance and for repair or servicing of the connecting arrangement (e.g., replacement of the plates). An inexpensive sheet metal cover can be used since the cover only has to seal the axial recess in the wheel hub.

A further reduction in the space required by the wheel hub drive according to the invention is obtained if the drive motor is a hydraulic motor, in particular a swash-plate type axial-piston motor, wherein the control block is located within the rear end of the wheel hub drive. The control piston is centrally located in the control block between the passages for the drive motor hydraulic fluid. Therefore, it is only necessary to tap into the drive motor circuit with a suitable control circuit to actuate the control piston.

A complete understanding of the invention will be obtained from the following description when taken in connection with the accompanying drawings wherein like reference characters identify like parts throughout.

DETAILED DESCRIPTION OF THE PREFERRED EMBODIMENTS

Figure 1:
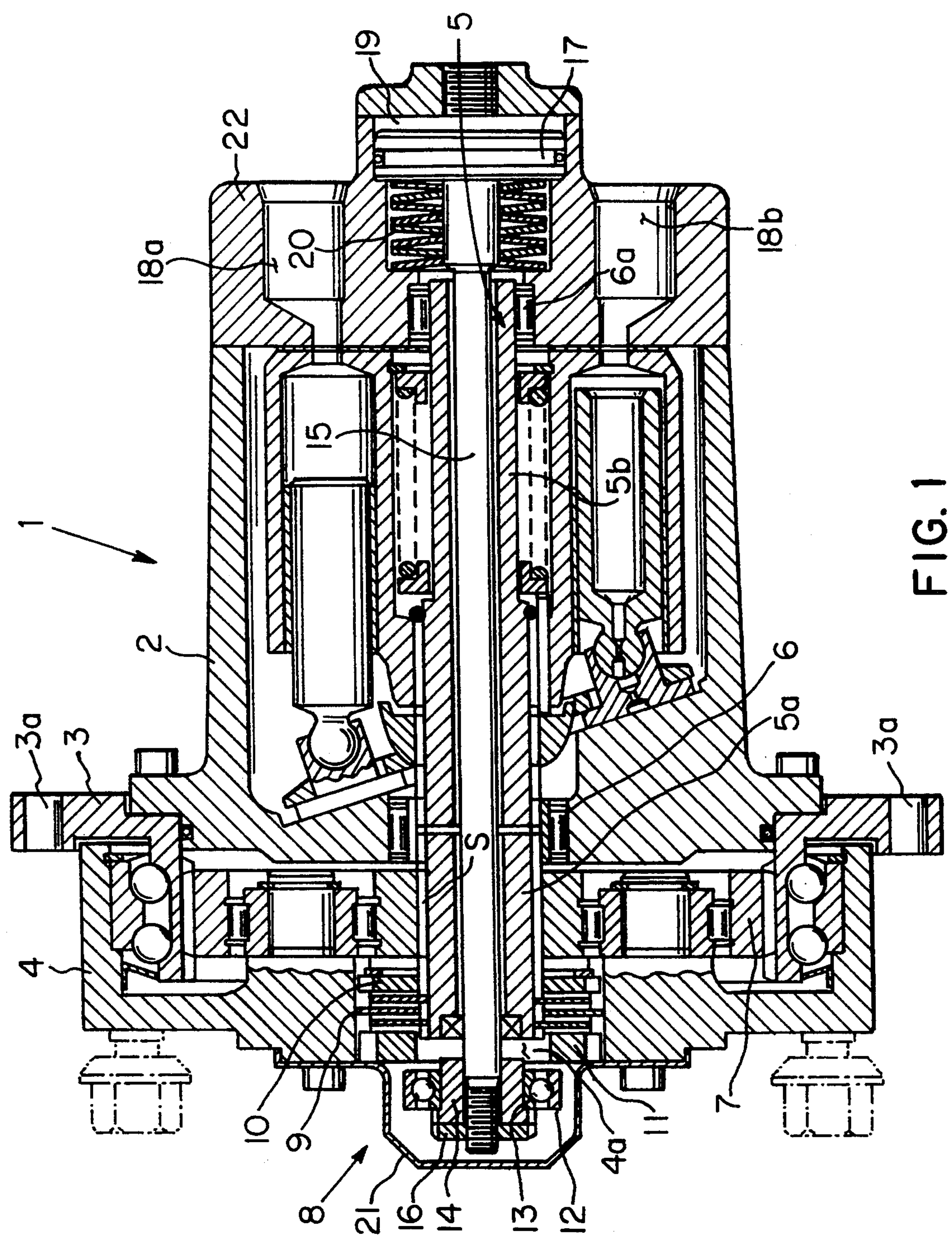
FIG. 1 is a longitudinal section of a wheel hub drive according to the invention.
Figure 2:
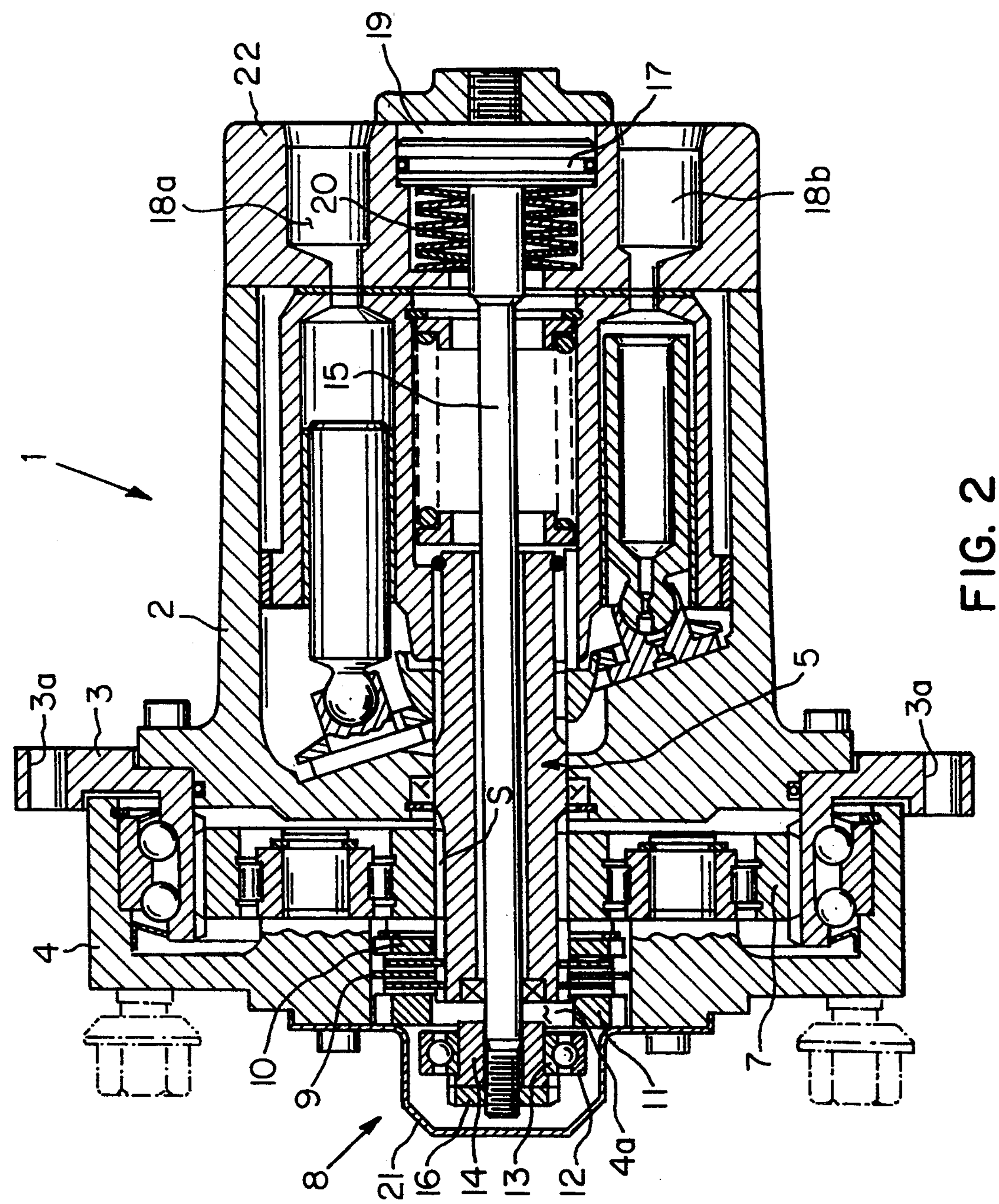
FIG. 2 is a longitudinal section of a second embodiment of a wheel hub drive according to the invention.

In the embodiments of the invention shown in FIGS. 1 and 2 of the drawings, the wheel hub drive includes a swash-plate type axial-piston hydraulic drive motor 1. However, as will be understood by those skilled in the art, other drive motors may be used such as, for example, an electric motor.

The end of housing 2 adjacent to the swash-plate of drive motor 1 is bolted to a stationary hub carrier 3. Hub carrier 3 includes an annular axial extension which forms the inner stationary race of a bearing. The hub carrier also includes a radial extension having a plurality of holes 3*a* formed therein to receive bolts (not shown) to connect the hub carrier to a shaft or to a stub axle. Hub carrier 3 rotatably supports a wheel hub 4 which is adapted to be connected to a wheel by studs as shown in dotted lines in the drawing figures. Wheel hub 4 forms the output element, i.e., the cage, of a single-stage planetary gear train which is located inside of the wheel hub. The annulus of the planetary gear train is formed on the inside surface of stationary hub carrier 3 and the sun wheels of the planetary gear train is formed on the outer surface of the forward section 5*a* of output shaft 5 of hydraulic drive motor 1. In the embodiment shown in FIG. 1 of the drawings, shaft 5 is split into a forward section 5*a* and a rear section 5*b*. If desired, two separate components may be provided in place of the sun wheel integral with the output shaft or with a section of the shaft. In such an arrangement, a unitary sun wheel is non-rotatably connected to the output shaft or to a section of the output shaft, for example, by axial splines.

With specific reference to FIG. 1 of the drawings, forward shaft section 5*a* is operatively connected to rear shaft section 5*b* by the inner race of a bearing 6 for hydraulic drive motor 1 which is formed with axial grooves corresponding with aligned axial splines formed on the outer surfaces of shaft sections 5*a* and 5*b*. Bearing 6 is located in housing 2 and supports one end of rear section 5*b*. The opposite end of rear section 5*b* is supported by a bearing 6*a*. Bearing 6 and planet gears 7 of the planetary gear train mounted on wheel hub 4 support the ends of forward section 5*a* of shaft 5. The length of forward section 5*a* is determined by the axial length of the sun wheel of the planetary gear train and by the portion of forward section 5*a* which extends into axial recess 4*a* in wheel hub 4.

A connecting arrangement in the form of a multi-plate brake or clutch 8 for connecting the sun wheel of the planetary gear train on section 5*a* of output shaft 5 of hydraulic drive motor 1 with wheel hub 4 (the cage of the planetary gear train) is located on the end of section 5*a* in recess 4*a* of wheel hub 4. Multi-plate brake or clutch 8 has annular friction plates or disks 9 which are alternately non-rotatably connected to section 5*a* and to wheel hub 4 and are axially displaceable along section 5*a* relative to an annular stop 10. Annular friction plates 9 of multi-plate brake or clutch 8 can be urged together axially by an annular component 11 which is adapted to be abutted by outer race 12 of an axial bearing. The term "axial bearing" as used herein includes a bearing which is normally employed as a radial bearing, as shown in the drawing figures. The bearing must be capable of transmitting axial forces to annular component 11 and annular friction plates 9. The inner race 13 of the axial bearing is located on bushing 14 which is threaded onto external threads formed on the end of an elongated axial rod 15 and is secured in the desired position along axial rod 15 by a lock nut 16.

Axial rod 15 passes through hollow sections 5*a* and 5*b* of output shaft 5. The end of axial rod 15 opposite multi-plate brake or clutch 8 is connected to a first face of a piston 17 which is axially displaceable inside of a chamber 19 located centrally between pressurized hydraulic fluid passages 18*a* and 18*b* in the control block 22 of hydraulic drive motor 1. Piston 17 is urged to the right as seen in the drawing figures, i.e., in the tensile loading direction of axial rod 15 by plate springs 20, so that outer race 12 of the axial bearing transfers a force against annular component 11 to slide the component and press annular friction plates 9 together and against stop 10. Thus, annular friction plates 9 of multi-plate brake or clutch 8 are urged into the closed position when no fluid pressure is applied to a second face of piston 17 opposite the first face which is connected to the end of axial rod 15.

When piston 17 is moved axially against the force of plate springs 20 by the introduction of hydraulic fluid into chamber 19 to open multi-plate brake or clutch 8, axial rod 15 is displaced. The position of the axial bearing, which has been set by prior adjustment of bushing 14, shifts to create a clearance between outer race 12 of the axial bearing and annular component 11. This clearance and the rotary freedom of the axial bearing prevent rotation of axial rod 15 and thus of piston 17 during operation.

The axial recess 4*a* in wheel hub 4 is closed by a cover 21 which can be removed as required to service multi-plate brake or clutch 8, e.g., replace worn friction plates 9, and to adjust the clearance between outer race 12 of the axial bearing and annular component 11.

In the embodiment shown in FIG. 2 of the drawings, the cylindrical drum of hydraulic drive motor 1 is mounted directly on the external circumference of a short output shaft 5 so that bearing 6*a* in the control block and connecting bearing 6 are eliminated. This arrangement decreases the length of the control block because it permits cylinder 19 and plate springs 20 to be located closer to the hydraulic drive motor cylinders. Thus, the overall axial length of the entire wheel hub drive is reduced.

The foregoing describes preferred embodiments of the invention and is given by way of example only. The invention is not limited to any of the specific features described herein, but includes all such variations thereof within the scope of the appended claims.

I claim:

1. A wheel hub drive including a wheel hub and a drive means for selectively driving said wheel hub, said drive means including a housing, a drive motor, a hollow output shaft operatively connected to said drive motor and having a first end located within said wheel hub, a planetary gear train including an input-end sun wheel rotated by said hollow output shaft, an output element fixed to said wheel hub, releasable connection means located at said first end of said hollow output shaft for selectively connecting and disconnecting said wheel hub and said hollow output shaft, an axially movable means for moving said releasable connection means, and means actuated by pressurized hydraulic fluid and by a spring force for moving said releasable connection means axially to connect and disconnect said releasable connection means to control rotation of said wheel hub by said drive means for said wheel hub, said means for moving said releasable connection means axially being an axial rod having a first end adjacent to said first end of said hollow output shaft and a second end, a piston having a first face fixed to said second end of said axial rod and a second face, spring means in contact with said first face of said piston to urge said piston in a first axial direction to connect said releasable connection means and means to supply a pressurized hydraulic fluid to said second face of said piston to move said piston against the force of said spring means in a second axial direction to disconnect said releasable connection means.

2. A drive as set forth in claim 1 wherein said spring means is a plurality of abutting plate springs.

3. A drive as set forth in claim 2 wherein said releasable connection means includes a series of coaxial annular friction plates, alternate annular friction plates being rotationally connected to said output shaft and to said wheel hub and axially movable relative to said output shaft and said wheel hub, an annular coaxial stop rotationally connected to said wheel hub, and means for moving said annular friction plates axially into and out of frictional engagement with one another and with said annular coaxial stop.

4. A wheel hub drive according to claim 3 including an axial recess formed in said wheel hub, said releasable connection means being located in said axial recess and cover means closing said axial recess.

5. A drive as set forth in claim 2 including an axial recess formed in said wheel hub, said releasable connection means being located in said axial recess and cover means closing said axial recess.

6. A drive as set forth in claim 1 wherein said releasable connection means includes a series of coaxial annular friction plates, alternate annular friction plates being rotationally connected to said output shaft and to said wheel hub and axially movable relative to said output shaft and said wheel hub, an annular coaxial stop rotationally connected to said wheel hub, and means for moving said annular friction plates axially into and out of frictional engagement with one another and said annular coaxial stop.

7. A wheel hub drive according to claim 6 including an axial recess formed in said wheel hub, said releasable connection means being located in said axial recess and cover means closing said axial recess.

8. A drive as set forth in claim 6 wherein said means for moving said annular friction plates is a coaxial annular component located adjacent said annular friction plates rotationally fixed to said wheel hub and axially movable relative to said output shaft and said wheel hub.

9. A drive as set forth in claim 1 including an axial bearing located adjacent to said second end of said axial rod, said axial bearing having a stationary inner race attached to said axial rod and a rotating outer race adapted to operatively engage one of said annular friction plates when said releasable connection means is connected.

10. A drive as set forth in claim 9 including means adjustably attaching said inner race of said axial bearing to said other end of said axial rod.

11. A wheel hub drive according to claim 10 including an axial recess formed in said wheel hub, said releasable connection means being located in said axial recess and cover means closing said axial recess.

12. A drive as set forth in claim 9 wherein said other end of said axial rod is threaded, and a bushing on said other end of said axial rod, said inner race of said axial bearing being fixed to said bushing.

13. A wheel hub drive according to claim 12 included an axial recess formed in said wheel hub, said releasable connection means being located in said axial recess and cover means closing said axial recess.

14. A wheel hub drive according to claim 9 including an axial recess formed in said wheel hub, said releasable connection means being located in said axial recess and cover means closing said axial recess.

15. A drive as set forth in claim 1 including an axial recess formed in said wheel hub, said releasable connection means being located in said axial recess and cover means closing said axial recess.

16. A drive as set forth in claim 1 wherein said drive motor is a swash-plate type hydrostatic axial-piston hydraulic motor having a control block, and passages formed in said control block to supply hydraulic fluid to said hydraulic motor and to said second face of said piston wherein said piston is located axially in said control block between said passages.

* * * * *

UNITED STATES PATENT AND TRADEMARK OFFICE
CERTIFICATE OF CORRECTION

PATENT NO. : 5,398,776
DATED : March 21, 1995
INVENTOR(S) : Franz Forster

It is certified that error appears in the above-indentified patent and that said Letters Patent is hereby corrected as shown below:

Title page, after [75] Inventor:, "Karstadt" should read --Karlstadt--.

Claim 13 Line 32 Column 6 "included" should read --including--.

Signed and Sealed this

Sixth Day of June, 1995

Attest:

BRUCE LEHMAN

*Attesting Officer* *Commissioner of Patents and Trademarks*